July 28, 1964    LA VON NELSON    3,142,474
VALVES FOR USE IN LABORATORY GLASSWARE
Filed April 6, 1962

INVENTOR
La Von Nelson
BY
Pennie Edmonds Morton Barrows Taylor
ATTORNEYS

# United States Patent Office 3,142,474
Patented July 28, 1964

3,142,474
VALVES FOR USE IN LABORATORY
GLASSWARE
La Von Nelson, Vineland, N.J., assignor to Lurex Manufacturing Company, Vineland, N.J., a corporation of New Jersey
Filed Apr. 6, 1962, Ser. No. 185,669
3 Claims. (Cl. 251—309)

This invention relates to laboratory glassware and is concerned more particularly with a novel valve, which is suitable for use as a part of such glassware. The new valve may be employed in various forms, as, for example, as a stopcock or as part of a burette, but, since all the advantages of the invention may be realized in a stopcock, different types of such a stopcock will be illustrated and described in detail for purposes of explanation.

Stopcocks used in chemical glassware have heretofore commonly included a glass barrel having an internal tapered surface and tubular side arms forming passages with openings in the surface. A glass plug having a tapering external surface mating with the internal surface of the barrel is mounted in the barrel and the plug has a diametrical passage, which connects the passages through the arms, when the plug is in the proper angular position. The mating tapered surfaces of the barrel and plug are ground and finished, so that the stopcock will be suitable for pressure or vacuum operation.

Stopcocks of the construction described are subject to sticking, when in use, as a result of substances from the interior of the apparatus, of which the stopcocks form part, becoming embedded in the ground mating surfaces or because of differential expansion of the barrel and plug. To overcome such sticking, many kinds of lubricants have been applied to the ground surfaces and, while such lubricants overcome sticking, their use is frequently undesirable because they may enter the apparatus and contaminate its contents. Accordingly, stopcocks have been made more recently with glass barrels and plugs made of a non-volatile, non-sticking synthetic material, which is resistant to chemical attack and to wear. The preferred material for the purpose is a synthetic tetrafluoroethylene resin sold commercially under the trademark "Teflon" and stopcocks with such plugs are not subject to sticking. However, "Teflon" resin is not highly resilient and, in order to obtain a tight seal in a stopcock having a glass barrel and a Teflon plug of conventional form, it is necessary to force the plug into such tight contact with the barrel, that manipulation of the plug to open and shut the stopcock may be difficult.

The present invention is directed to the provision of a novel valve for use in laboratory glassware, which is not subject to sticking, provides a better seal than that in prior stopcocks, and is easy to manipulate. In the new valve, the barrel is formed of glass and has a tapered internal surface which is conventional except that the taper is preferably 1:5 instead of 1:10. The plug of the new stopcock is made of "Teflon" resin and it differs from the usual plug made of such resin in that the external surface of the plug is so formed that a good seal is obtained with much less contact between the plug and barrel than has heretofore been used. The new valve includes other novel features to be pointed out later.

For a better understanding of the invention, reference may be made to the accompanying drawing, in which FIG. 1 is a longitudinal sectional view through a stopcock constructed in accordance with the invention;

Figure 1A:
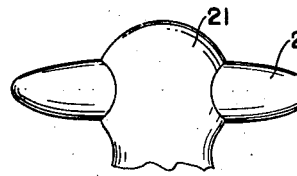
FIG. 1a is a fragmentary elevational view of the upper end of the stopcock plug shown at right angles to FIG. 1.
Figure 1:
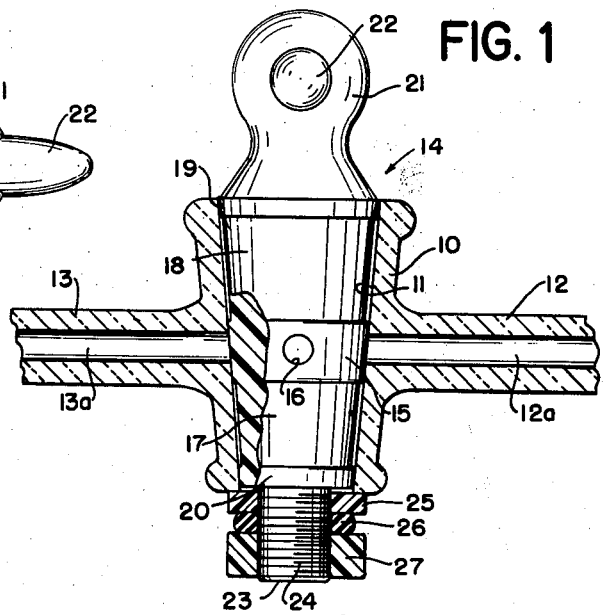

The stopcock shown in FIG. 1 comprises a barrel 10 open at the top and the bottom and having an internal surface 11 of frusto-conical shape tapering from top to bottom. The taper of the internal surface is preferably 1:5 instead of the 1:10 taper ordinarily used and the surface is finished by fine grinding, after which the surface is either further ground to a satin finish or is polished or is glazed in accordance with the process described in the patent to Geyer et al. 2,169,194, issued August 8, 1939. The barrel is provided with side arms 12, 13 having respective passages 12a, 13a of the same diameter with openings at their inner ends in the surface 11 and the side arms are in alignment across the interior of the barrel.

A plug 14 is disposed within the barrel and the plug is made of a non-volatile, non-sticking, tough, wear-resistant synthetic material, which resists attack by most chemical compounds, the material presently preferred for the plug being the synthetic tetrafluoroethylene resin sold commercially under the trademark "Teflon." The plug is formed with an external surface of the shape of a surface of revolution and is provided with a central circumferential sealing strip 15, which is adapted to contact with an area of the internal surface of the barrel concentric with the axis of that surface and containing the openings at the inner ends of the passages 12a, 13a. The sealing strip is only slightly wider than the diameters of the passages 12a, 13a and may, for example, be 3 mm. to 7 mm. wider than the passage diameter. The plug is provided with a diametrical passage 16 having openings in the surface of the sealing strip of the diameter of the passages 12a, 13a and in the plane of the passages 12a, 13a. Accordingly, by rotation of the plug, the passage 16 may be placed to connect the passages 12a, 13a or may be disposed out of alignment with passages 12a, 13a, so that the ends of the passages are closed by the sealing strip.

On opposite sides of the sealing strip, the plug is formed with sections 17, 18, which are of smaller diameter than the sealing strip 15 and thus out of contact with the internal tapered surface of the barrel. At its opposite ends, the plug has bearing strips 19, 20 of such form and diameter as to make contact with the internal surface 11 of the barrel and the bearing strips are relatively narrow and may have a width from 1 to 2 mm. As shown, the sections 17, 18 each have a width substantially greater than the widths of the sealing strip 15 and the bearing strips. The bearing strips may also serve as sealing means and the surfaces of these strips and of the sealing strip 15 are fine ground and free of pit marks and pores.

The plug extends out of the large end of the barrel to terminate in a head 21 carrying a cross-bar 22, by which the plug can be readily turned. At its opposite end, the plug has a stem 23 projecting out of the small end of the barrel and provided with external screw threads 24 of the National Fine Screw Thread Series. A washer 25 of suitable synthetic material is mounted on the stem and lies in contact with the lower end of the barrel and an O-ring 26 of resilient material, such as natural or synthetic rubber, encircles the stem outwardly from the washer. A nut 27 threaded on the stem may be tightened to compress the O-ring and cause the plug to be drawn inwardly into the barrel.

Figure 3:
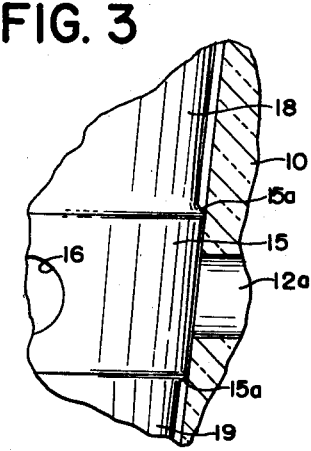
FIG. 3 is a fragmentary sectional view showing the deformation of the sealing strip of the stopcock of FIG. 1.

With the construction described, it will be seen that the contact between the external surface of the plug and the internal surface of the barrel is confined to the sealing strip 15 and the bearing strips 19, 20. Since the sealing strip is not substantially wider than the diameter of the passages 12a, 13a and the bearing strips 19 and 20 are quite narrow, the total area of contact between the opposed surfaces of the plug and barrel may be of the order of 40% of the total area of the internal surface of the barrel. However, a good seal is obtained between the plug and the barrel, even though the "Teflon" resin has little resilience, because the narrow sealing strip may be deformed not only radially, that is, toward and away from the axis of the plug, but also in a direction lengthwise of the plug, as shown at 15a in FIG. 3. As a result, a tight contact between the surfaces of the sealing strip and barrel may be obtained with little force used to draw the plug into the barrel. If the entire external surface of the plug were in contact with the mating internal surface of the barrel, it would be almost impossible to effect any deformation in a direction longitudinally of the plug of the section of the plug corresponding to the sealing strip 15. The seal between the plug and the barrel would, therefore, have to depend on deformation of the plug toward and away from the plug axis and, in order to obtain a good seal, the plug would have to be drawn into the barrel under substantial spring pressure. Because of the necessity of using so strong a spring and of the frictional contact between the plug and barrel over their entire mated surfaces, turning of the plug to open and shut the stopcock would be difficult.

With the construction illustrated, a good seal between the sealing strip and the barrel is obtained by turning the nut 27 to such an extent that the O-ring is only relatively lightly compressed. With such a light force applied to the plug and the small total area of contact between the plug and barrel, manipulation of the plug is relatively easy. Also stripping of the threads on the stem 23 is avoided.

Figure 2:
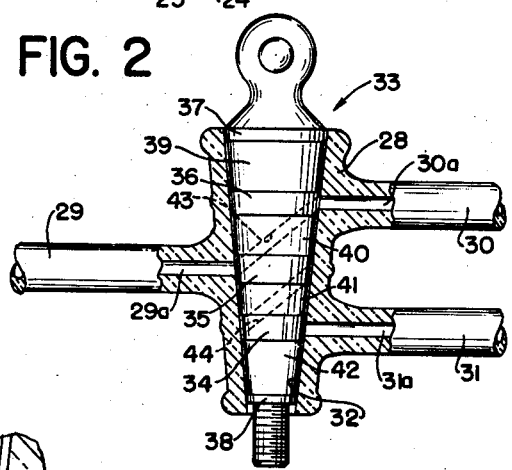
FIG. 2 is a view, partly in longitudinal section and partly in elevation, of a modified form of the new stopcock.

In the modified form of the stopcock shown in FIG. 2, the barrel 28 has a single side arm 29 at one side and two parallel side arms 30, 31 at the other, the side arms all lying in a plane through the axis of the barrel. The side arms have respective passages 29a, 30a, and 31a with openings at their inner ends lying in the internal ground tapered surface 32 of the barrel. The plug 33 has a circumferential sealing strip 34 in contact with an area of the internal surface 32 of the barrel which contains the opening at the inner end of the passage 31a and the plug is also formed with a sealing strip 35, which makes contact with the internal surface of the barrel over an area containing the opening at the inner end of the passage 29a. The plug has a sealing strip 36 making contact with the internal surface of the barrel over an area containing the opening at the inner end of the passage 30a. At its upper and lower ends, the plug has bearing strips 37, 38 in contact with the internal surface of the barrel and between the bearing strip 37 and the sealing strip 36, the plug has a section 39 out of contact with the internal surface of the barrel. Similarly, the plug has a section 40 between the sealing strips 35 and 36, a second 41 between the sealing strips 34, 35, and a section 42 between the sealing strip 34 and the bearing strip 38, which lie out of contact with the internal surface of the barrel.

In order that the passage 29a may be connected to the passage 30a, the plug is formed with a passage 43 which lies in a plane through the axis of the plug and has one end open at the surface of the sealing strip 35 and the other at the surface of the sealing strip 36. The plug has a second passage 44 in a plane through its axis with one end of the passage open at the surface of the sealing strip 35 and the other at the surface of the sealing strip 34. The passages 43, 44 are so formed that, when the plug 33 is firmly seated on the internal surface of the barrel and is in proper angular position, the passage 43 connects the passages 29a, 30a while the passage 31a is sealed by the sealing strip 34. Alternatively, the passage 44 may connect the passages 29a and 31a, while the passage 30a is sealed by the sealing strip 36.

The sealing strips 34, 35 and 36 on the plug 33 are not substantially wider than the diameter of the passages 29a, 30a, and 31a and may exceed that diameter by from 3 to 7 mm., while the bearing strips 37 and 38 have a width of 1 to 2 mm. The sections 39, 40, 41, and 42 have a combined width greater than the combined widths of the sealing and bearing strips but, since the plug 33 has three sealing strips, the total area of contact between the plug and the barrel is a greater percentage of the area of the internal surface of the barrel than in the stopcock of FIG. 1 and may be of the order of 60% of the area of the internal surface. However, since the plug 33 need be forced into the barrel with only light pressure in order to obtain a good seal, the plug can be manipulated as desired without difficulty.

I claim:

1. In laboratory glassware, a valve which comprises a glass barrel having an internal surface of the shape of a surface of revolution tapering from one end to the other, passageways through the wall of the barrel to the interior thereof, the passageways having openings in the internal surface of the barrel and intersecting a plane through the axis of such surface, a plug of a tough, non-volatile, non-sticking synthetic material rotatably mounted in the barrel and having a circumferential sealing strip between its ends in contact with an area of the internal surface of the barrel concentric with the axis of such surface and containing at least one of the passageway openings, the sealing strip being not substantially wider than the diameter of the opening contained in such area and the plug having circumferential sections on opposite sides of the sealing strip out of contact with the internal surface of the barrel, a passageway through the plug in a plane through the plug axis, the passageway having at least one end opening in the outer surface of the sealing strip between the lateral edges thereof, relatively narrow bearing strips encircling the plug and in contact with the internal surface of the barrel near its ends, and means for yieldingly drawing the plug into the barrel to maintain contact between the sealing and bearing strips and the inner surface of the barrel.

2. The valve of claim 1, in which the plug is formed of tetrafluoroethylene.

3. The valve of claim 1, in which the engagement of the sealing and bearing strips with the inner surface of the barrel constitutes the sole means for sealing the valve against leakage.

References Cited in the file of this patent

UNITED STATES PATENTS

| | | |
|---|---|---|
| 251,019 | Babcock | Dec. 20, 1881 |
| 2,206,816 | Levitt | July 2, 1940 |
| 2,876,985 | Birchall | Mar. 10, 1959 |
| 2,973,183 | Alger | Feb. 28, 1961 |